United States Patent
Weber

(10) Patent No.: US 8,135,035 B2
(45) Date of Patent: Mar. 13, 2012

(54) VIDEO OVER CABLE MODEM

(75) Inventor: Barry Jay Weber, Carmel, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 606 days.

(21) Appl. No.: 12/225,273

(22) PCT Filed: Jan. 12, 2007

(86) PCT No.: PCT/US2007/000889
§ 371 (c)(1),
(2), (4) Date: Sep. 17, 2008

(87) PCT Pub. No.: WO2007/111764
PCT Pub. Date: Oct. 4, 2007

(65) Prior Publication Data
US 2010/0232325 A1    Sep. 16, 2010

(51) Int. Cl.
*H04J 3/24* (2006.01)
(52) U.S. Cl. ........ 370/474
(58) Field of Classification Search .......... None
See application file for complete search history.

(56) References Cited

U.S. PATENT DOCUMENTS

| | | | |
|---|---|---|---|
| 7,007,296 B2 | 2/2006 | Rakib | |
| 7,023,871 B2* | 4/2006 | Lind et al. | 370/437 |
| 7,023,882 B2* | 4/2006 | Woodward, Jr. et al. | 370/487 |
| 7,248,590 B1* | 7/2007 | Liu | 370/395.64 |
| 7,349,386 B1* | 3/2008 | Gou | 370/356 |
| 7,403,547 B2* | 7/2008 | Downey et al. | 370/503 |
| 7,583,704 B1* | 9/2009 | Walker et al. | 370/503 |
| 7,653,090 B2* | 1/2010 | Oz et al. | 370/486 |
| 7,688,828 B2* | 3/2010 | Chapman et al. | 370/395.21 |
| 7,693,171 B2* | 4/2010 | Gould | 370/432 |
| 2001/0030975 A1* | 10/2001 | Limb et al. | 370/465 |
| 2001/0049720 A1 | 12/2001 | Eyer | |
| 2002/0018463 A1* | 2/2002 | Rabenko | 370/352 |
| 2002/0038461 A1 | 3/2002 | White et al. | |
| 2002/0046406 A1* | 4/2002 | Chelehmal et al. | 725/87 |
| 2002/0056143 A1* | 5/2002 | Hodge et al. | 725/153 |
| 2002/0147990 A1* | 10/2002 | Lu et al. | 725/135 |
| 2003/0035442 A1 | 2/2003 | Eng | |
| 2003/0058887 A1* | 3/2003 | Dworkin et al. | 370/470 |
| 2005/0123001 A1* | 6/2005 | Craven et al. | 370/486 |
| 2005/0138669 A1* | 6/2005 | Baran | 725/111 |
| 2005/0141539 A1* | 6/2005 | Hamilton et al. | 370/432 |
| 2006/0130107 A1* | 6/2006 | Gonder et al. | 725/110 |

(Continued)

OTHER PUBLICATIONS

"Next-Generation CMTS Architecture: Protecting Network Investments While Migrating to Next-Generation CMTS Platforms", 2004, Motorola.*

(Continued)

*Primary Examiner* — Ayaz Sheikh
*Assistant Examiner* — Timothy J Weidner
(74) *Attorney, Agent, or Firm* — Robert D. Shedd; Robert B. Levy; Jeffrey D. Hale

(57) ABSTRACT

Disclosed is a system including a plurality of modulators for receiving at least one of first data signals from a termination and for receiving at least one of second data signals from other than the termination and for combining the at least one of first data signals and the at least one second data signals into an output signal having a plurality of data channels for delivery to a plurality of modems where the at least one of second data signals bypass the termination.

17 Claims, 3 Drawing Sheets

U.S. PATENT DOCUMENTS

2007/0076764 A1* 4/2007 Kawada et al. ............... 370/503
2007/0097639 A1* 5/2007 de Heer et al. ................ 370/390
2007/0180072 A1* 8/2007 Siripunkaw et al. .......... 709/220
2008/0134262 A1* 6/2008 Jung et al. .................... 725/109
2009/0016218 A1* 1/2009 Hong et al. ................... 370/231

OTHER PUBLICATIONS

International Search Report, dated Jun. 26, 2007.

* cited by examiner

VIDEO OVER CABLE MODEM

CROSS-REFERENCE TO RELATED APPLICATIONS

This application claims the benefit, under 35 U.S.C. §365 of International Application PCT/US2007/000889 filed Jan. 12, 2007, which was published in accordance with PCT Article 21(2) on Oct. 4, 2007 in English and claims priority of United States Provisional patent application No. 60/787,003 filed Mar. 29, 2006.

TECHNICAL FIELD

The present invention generally relates to cable systems and, more particularly, to cable signal distribution systems and methods that improve efficiency and reduce cost.

BACKGROUND

Data-Over-Cable Service Interface Specification (DOCSIS) modem operation includes narrow bandwidth channels (6 or, 8 MHz, 40-50 Megabits per second (Mbps)) for downstream transmissions and even narrower upstream transmission channels (10's kHz-100's kHz). Currently, Cable Modem Termination Systems (CMTS) used to support customer's cable modems can support large numbers of customers with a single downstream channel and one or two upstream channels.

Recently, transmission of High Definition Television (HDTV) signals has become increasingly common. The transmission of video data, and especially HDTV video' data, is highly bandwidth intensive due to the amount of data that must be transmitted to support the video stream. However, the bandwidth allocation of present systems does not support delivery of video to large numbers of subscribers without increasing the throughput of the entire CMTS system. For instance, for video to be delivered to approximately 100 subscribers, the capacity of a CMTS must approach at least 500 Mbps to 1000 Mbps for the video alone.

Therefore, it would be advantageous to provide systems and methods that permit video delivery to a large number of customers without excessive replication of the CMTS functionality and throughput capabilities. Preferably, the system would allow video to be delivered to end customers while avoiding video data passing through the CMTS at all.

SUMMARY

In one aspect of the invention a system includes a plurality of modulators for receiving at least one of first data signals from a termination and for receiving at least one of second data signals from other than the termination and for combining the at least one of first data signals and the at least one second data signals into an output signal having a plurality of data channels for delivery to a plurality of modems where the at least one of second data signals bypass the termination. Preferably, the second video data signal will be a video signal. Additionally, the modulators may be Quadrature Amplitude Modulators that modulate multiple video signals into multiple video channels on a single signal for delivery to end users, with each end user associated with a separate video channel.

In another aspect of the invention, a system for video distribution includes a termination for a cable modem configured to transmit the plurality of first data signals; a plurality of modulators disposed downstream from the termination which are each configured to receive one or more of the plurality of first data signals from the termination and configured to receive one or more second data signals from a different source, each of the plurality of modulators being configured to combine the one or. more of the plurality of first data signals and the one or more second data signals into an output signal having a plurality of data channels, the output signal for delivery to a plurality of cable modems where the one or more second data signals bypass the termination; and a diplexer configured to receive a plurality of upstream data signals over a transmission line from the plurality of cable modems and transmit the plurality of upstream data signals to the termination, wherein the plurality of upstream data signals bypasses the plurality of modulators, and the diplexer being configured to receive a one or more output data signals from the plurality of modulators and to transmit the one or more output data signals to the plurality of cable modems over the transmission line.

In a further aspect of the invention, a method for video distribution includes receiving at least one first data signal from a termination; receiving at least one digital video signal including digital video data from at least one video server, wherein the at least one digital video signal bypasses the termination; and inserting data from the at least one digital video signal into one of the at least one digital data signal to create an output signal.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
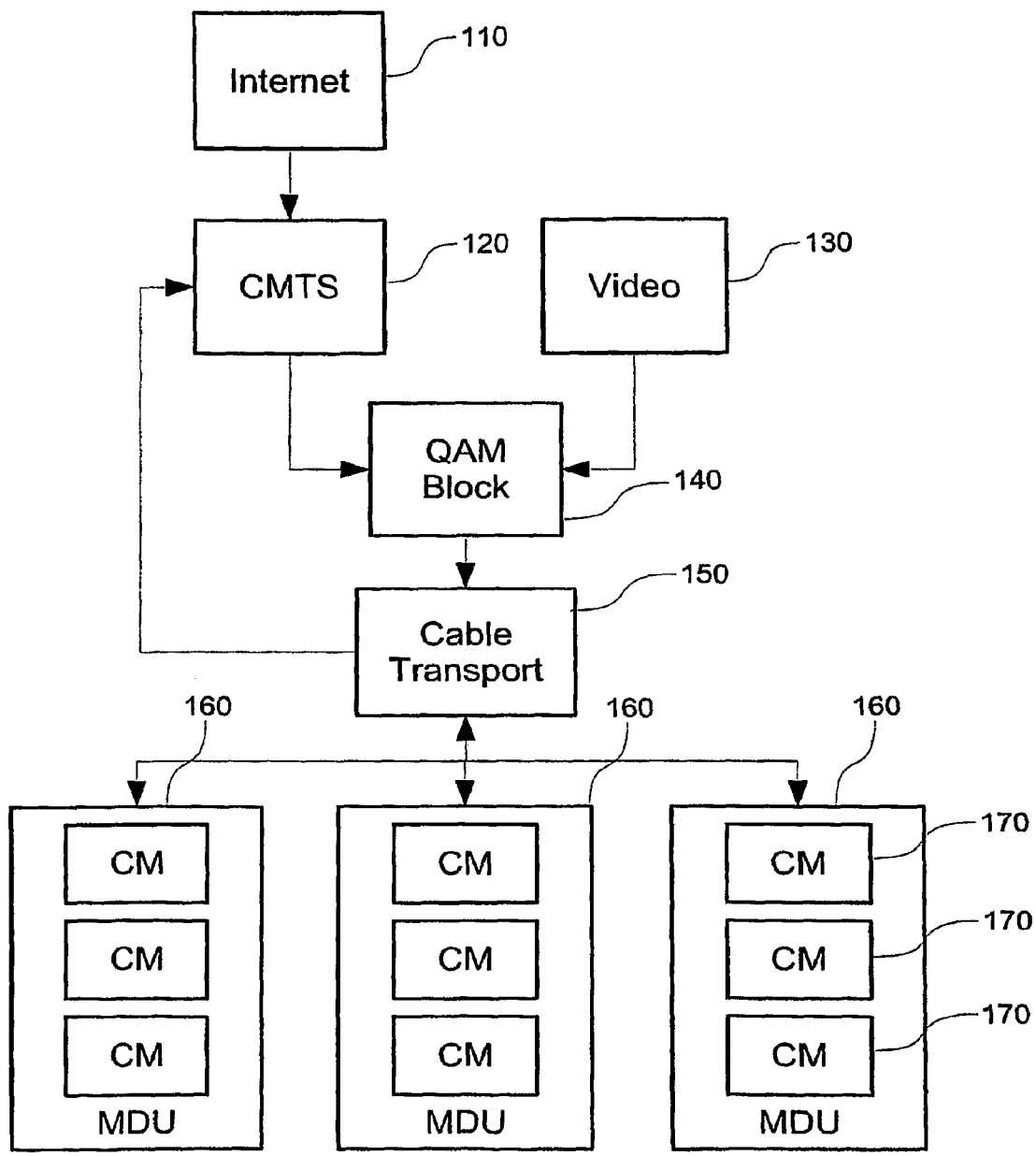
FIG. 1 is block diagram of an exemplary system for delivery of video over a cable modem in accordance with one embodiment of the present invention.

It should be understood that the drawings are for purposes of illustrating the concepts of the invention and are not necessarily the only possible configuration for illustrating the invention.

DETAILED DESCRIPTION OF THE INVENTION

The present embodiments provide video content distribution to a large number of customers or subscribers. In particularly useful embodiments, Internet protocol (IP) video distribution over a cable plant is cost effectively enabled with a very asymmetric distribution system. A Data-Over-Cable Service Interface Specification (DOCSIS) Cable Modem Termination System (CMTS) (or equivalent type of device) and multiple downstream Quadrature Amplitude Modulators (QAMs) IP video inserters are employed such that the CMTS handles all upstream traffic and all control traffic for cable modems. The CMTS may advantageously handle the upstream data traffic from the cable modems directly, for example, without the upstream traffic being routed through the QAMs. The present principles enable one standard CMTS to support hundreds of cable modems, or IP receivers, with total system data rates over 1 Gbps, limited only by the number of QAM channels. In order to reduce the number of CMTSs needed to service large numbers of end users, the QAM video inserters add video data to a downstream data signal after IP data is handled by the CMTS.

It is to be understood that the present principles are described in terms of a cable distribution system; however, the present invention is much broader and may include any content distribution system which is capable of delivery of content over a network. For example, the present embodiments are applicable to any distribution method including distribution of data or packets by telephone network (wired or wireless), computer network, cable network, satellite network, etc.

It should be further understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Cable industry groups have developed a standard for a CMTS that can handle up to 1 Gbps of data downstream and then distribute that data to a plurality of QAM modulators. However, providing video to the same end users through the CMTS needs significantly more hardware than providing only data. Therefore, inserting video into the data stream after the data stream is processed by the CMTS is preferred. Additionally, by using QAM modulators to handle the insertion of video into the data stream, each QAM modulator may combine multiple data streams to be sent downstream as a single signal over one transmission line. Furthermore, multiple QAM modulator output signals may be multiplexed together for transmission over a transmission line.

Generally, in order to keep the downstream signal synchronized, a CMTS may insert null IP packets into the data stream as placeholders. Skilled artisans will recognize that IP packets have a data payload and header information with control bits indicating how a particular packet is to be handled. Null packets have no control bits set, with the data payload being ignored. Furthermore, in a cable modem system, the CMTS may send control packets to the cable modem or set top box. In the case of a DOCSIS compliant cable modem, these control packets may take the form of DOCSIS data packets. In the case of both null packets and control packets, the QAM modulator may advantageously insert video data into the payloads of such packets.

The QAM modulators are edge devices that can accept the CMTS data stream and an MPEG2 video stream for delivery to a cable modem or set top box that has multiple downstream tuners, or demultiplexers, with at least one tuner for the video and one tuner for the cable modem.

Details of the individual block components making up the system architecture are known to skilled artisans, and will only be described in details sufficient for an understanding of the present invention.

Referring now in specific detail to the drawings in which like reference numerals identify similar or identical elements throughout the several views, and initially to FIG. 1, an exemplary system for delivery of video over a cable modem (the system) 100 in accordance with one embodiment of the present invention is shown. Initially, data is communicated from the Internet 110, or any other communications network, to a CMTS 120. In one useful embodiment, the CMTS 120 converts the digital, packetized data into a signal suitable for transmission over standard copper coaxial cable. This may allow the system to advantageously use existing cable systems without requiring upgrades to the copper cable lines carrying data directly to the customer's premises. However, as fiber optic lines laid all the way to end users' premises become more common, the use of a signal capable of being transmitted over any other kind of transmission media is contemplated by the present principles as well.

The CMTS 120 then communicates data to a Quadrature Amplitude Modulator (QAM) block module 140. In one useful embodiment, the CMTS 120 will insert null packets into the data signal to fill empty segments of the data signal. In another useful embodiment, the CMTS 120 may add control packets to the data stream capable of controlling the cable modem 170 or set top box. For instance, the CMTS. 120 may send control packets to the set top box setting, renewing, or otherwise managing the set top box's IP address. In some cases, the control packets may not have a full data payload, or may have no data in the data payload at all, with the IP header having the control information.

Video data 130 is also communicated to the QAM block 140. The QAM block combines the video data 130 and data received from the CMTS 120 into a single signal that is then communicated over a cable transport 150 to a plurality of Multiple Dwelling Unit (MDUs) 160, each MDU 160 in turn having a plurality of cable modems (CMs) 170 installed. The cable modems 170 may be set-top boxes, stand-alone cable modems, networking routers, or the like. In one useful embodiment, the video data may be encapsulated in IP packets. Such IP encapsulation may allow addressing of video data to specific set top boxes, and may be advantageously handled by existing networking equipment.

The cable modems 170 may advantageously have multiple tuners for acquiring a data signal or video signal separately. In one preferred embodiment, a cable modem 170 is deployed at the end user's dwelling, and may have two tuners. Preferably, one tuner would be configured to acquire digital internet data from the incoming signal, and route such data to the user's computer or household network. The second tuner may be configured to acquire the video data from the incoming signal, and may route video signal to a cable ready set top box, home theatre tuner, television, or the like, at the user's dwelling.

A cable modem 170 may also have, a television channel control and tuning system, where the user may interact with the cable modem to select the desired television channel, purchase pay-per-view content, etc. In one preferred embodiment, the cable modem may be configured to acquire the incoming digital video signal, assemble the digital video signal into any standardized signal capable of display on a television, and may transmit the television signal directly to a display such as the user's television.

Commonly, in urban areas with dense populations, a single cable runs to the MDU 160, where the signal is split at the MDU 160 itself for each individual unit in the MDU 160. MDUs 160 may take the form of apartment buildings or complexes, condos, 2, 3 or 4 family houses, or the like. Similarly, in suburban areas, a single cable may service a city block, a subset of houses in a subdivision, a full subdivision, or the like. It should be noted that the reference to MDUs 160 is merely to represent a group of dwellings that are geographically related.

In such areas the cable may carry a signal to a neighborhood cable splitter, which then splits the signal to service each house on a block. In order to make full use of the bandwidth available over a single cable, a QAM modulator may set up a channel for each cable modem 170 or end user serviced by a particular physical cable. On the cable modem 170 side, each cable modem 170 is allocated a single downstream channel, or frequency. Each cable modem 170 also shares a small frequency allocation for the upstream communication.

Figure 2:
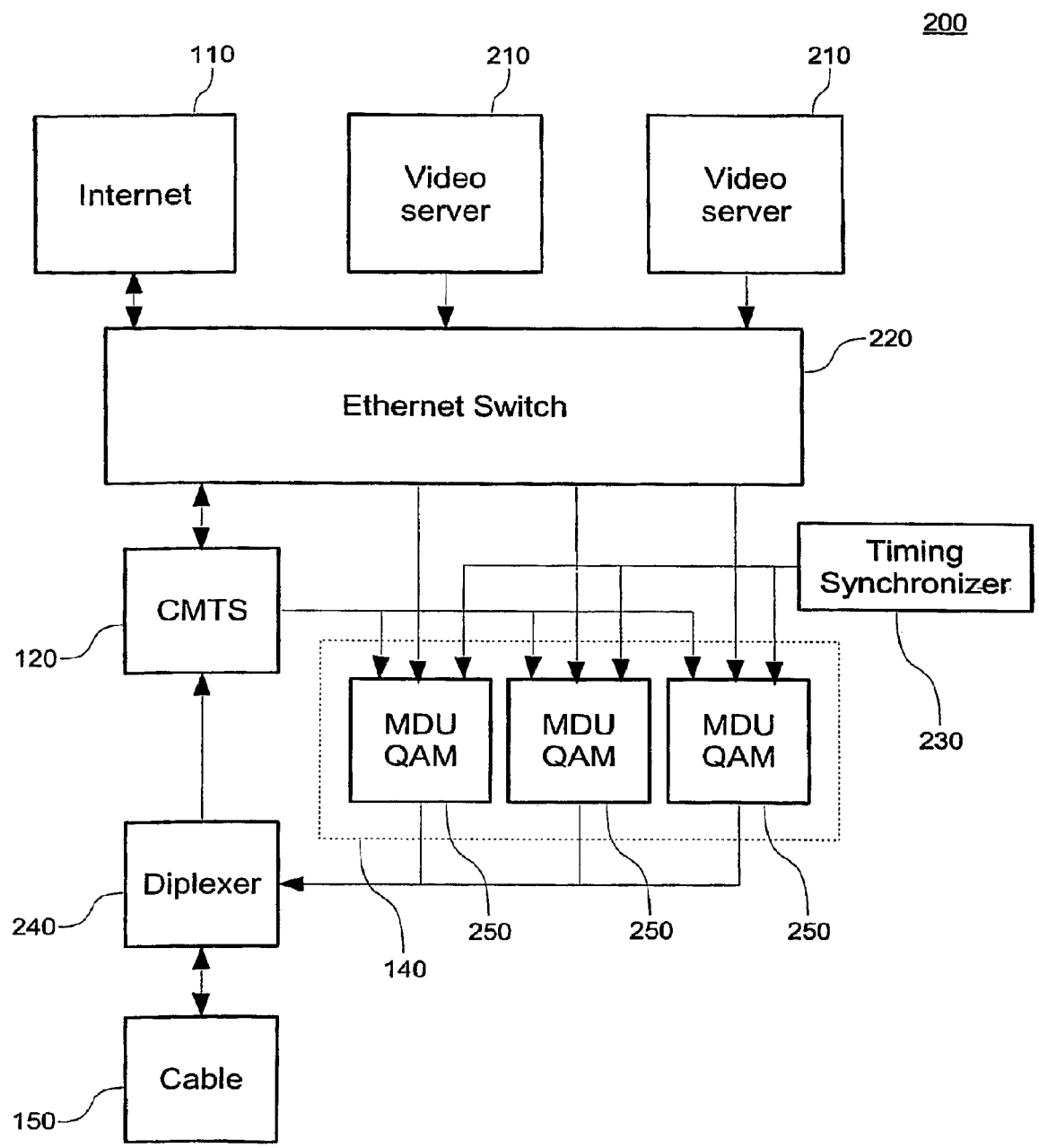
FIG. 2 is a block diagram of an illustrative system for inserting video into a data stream in accordance with an embodiment of the present invention.

Referring now to FIG. 2, a system for inserting video into a data stream in accordance with an embodiment of the present invention is described. In one preferred embodiment, an Ethernet switch 220, receives data from the Internet and from a plurality of video servers 210. The Ethernet switch 220 may then advantageously communicate IP data to a CMTS 120, where the digital IP data is converted into a signal suitable for transmission over cable. The Ethernet switch 220 may then pass video data directly to one of a plurality of MDU QAMs 250 in a QAM block 140. In one useful embodiment, the Ethernet switch may route video encapsulated in IP packets to a specific QAM block 140 based in the IP address of the IP packet. However, in another useful embodiment, the video data may be transmitted to the MDU QAM modules 250, and the Internet data may be transmitted to the CMTS 120, thereby eliminating the need for an Ethernet switch altogether. Skilled artisans will recognize that to eliminate the Ethernet switch 220, the Internet data will need to be properly routed and handled prior to being received at the CMTS 120.

The CMTS 120 may also pass the cable ready signal to the MDU QAM modules 250 so that a video stream from the video servers 210 may be added to the data stream processed by the CMTS 120. Alternatively, the video servers 210 may communicate video data directly to the MDU QAM modules 250 in the QAM block 140. The video servers 210 may, in one useful embodiment, be a Captiva™ video server, standard head end video service equipment, or the like.

The MDU QAM modules 250 then combine the IP data signal from the CMTS 120 with the video data signal from the video servers 210, and output the combined signal to a diplexer 240. Diplexers are frequently used to handle data streams moving in opposing directions, and are well known to those artisans skilled in data communications.

In a useful embodiment, the diplexer 240 may accept downstream data from a plurality of MDU QAM modules 250 in a QAM block 140, which the diplexer 240 then transmits over a cable 150 to users' cable modem 170. The diplexer 240 may also receive upstream data traffic from the cable, the data representing requests, file transfers, or any other kind of data transmitted from end users' cable modems over the cable 150, which may then be transmitted to the CMTS 120.

The use of a diplexer, along with QAM modules 250 separate from the CMTS 120, permits the CMTS 120 to avoid handling any downstream video data intended for the video set top boxes. Therefore, the CMTS 120 will only handle upstream data from the cable modem and downstream Internet data that terminates at the cable modem.

In one preferred embodiment, the QAM block 140 may have one or more MDU QAM modules 250 embodied in a single processor, circuit, or the like. For instance, a single QAM block 140 may have 4 MDU QAM modules 250 on a single field programmable gate array chip, where each MDU QAM module 250 acts separately from the others on the chip.

A timing synchronizer 230 may transmit a timing signal to each of the MDU QAM modules 250. In one useful embodiment, the timing signal is used by each MDU QAM module 250 to synchronize the phase of the multiplexed output signal with the timing of the output signals of any other MDU QAMs in the MDU block 140. Another useful embodiment may also include the signal from the timing synchronizer 230 being used to synchronize all of the channels being provided within a MDU QAM module 250 as well. It may be further advantageous to combine the synchronization across a plurality of MDU QAM modules 250 with channel synchronization within each MDU QAM module 250 to ensure that the channels across multiple MDU QAM modules 250 are synchronized as well. Since the MDU QAM modules 250 multiplex signals in a time slotted, phase shifted manner, the synchronization of channels becomes useful for proper transmission without data degradation.

In one useful embodiment, the QAM modulator 340 may modulate 2, 4, 8 or more combined data and video streams onto separate channels, with the timing signal used to synchronize the bits of each channel so that they do not overlap in the output stream. Each cable modem 170 may also be advantageously assigned a separate video data channel. In this manner, the present principles permit the customization and granular user management of the video signal for each individual cable modem 170, and hence, each individual customer.

The QAM module 250 may be used to deliver multiple video streams to a single, local termination point. In one useful embodiment, a cable 150 is laid from a cable operator's central office or local service facility, where a CMTS 120 resides, to one or more MDUs 160. Because the existing cable infrastructure includes, in part, dedicated cables laid to each existing dwelling, both upstream and downstream data may be sent over the same cable. In another useful embodiment, multiple QAM module 250 output signals may be sent over a single cable, where each QAM module 250 has modulated its respective output signal at a set of frequencies different from other QAM modules 250. This will allow the equipment at an MDU 160 to successfully filter out the single QAM module 250 output signal that was intended for a particular MDU 160. The filtered QAM module 250 output signal arriving at the MDU may then be further split into channels, or signals, intended for individual cable modems 150.

Figure 3:
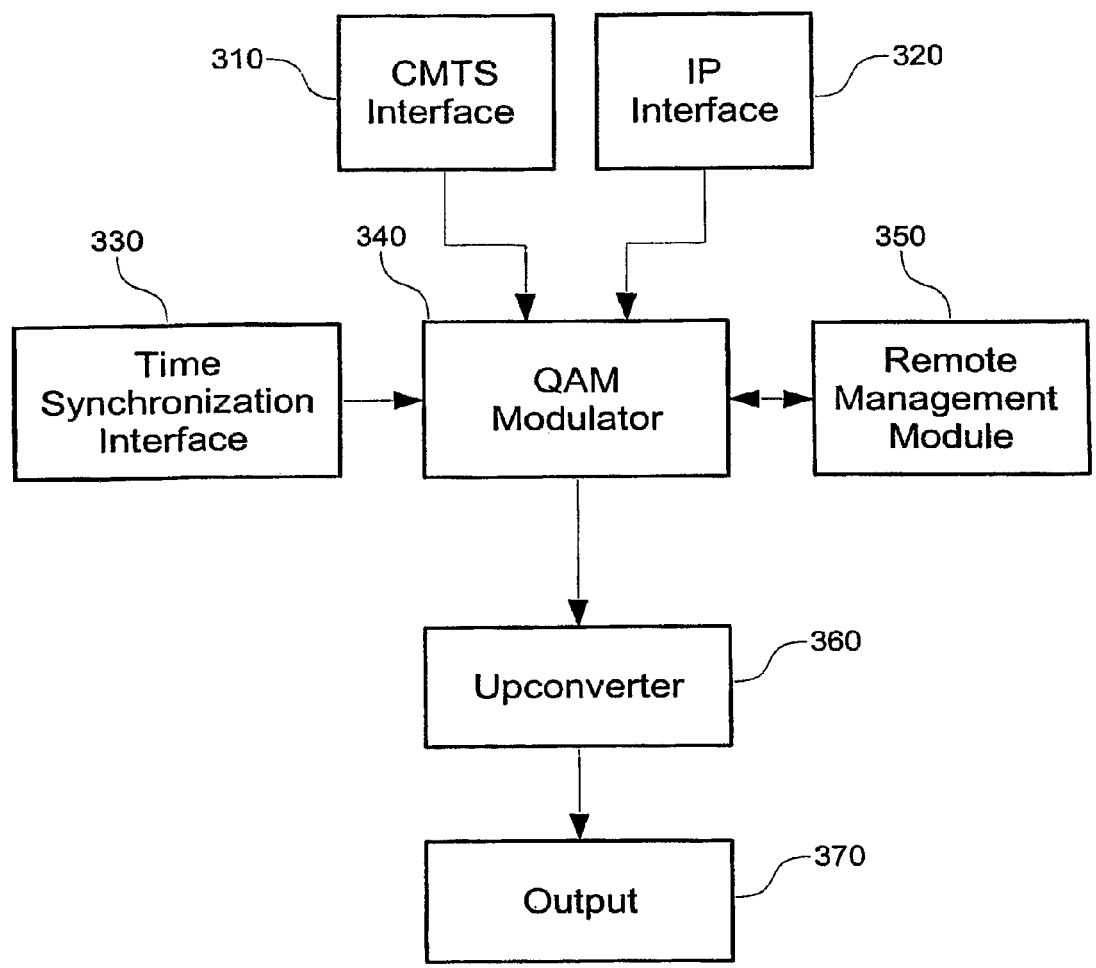
FIG. 3 is a block diagram showing a Quadrature Amplitude Modulator module in accordance with an illustrative embodiment of the present invention.

FIG. 3 depicts a QAM module 250 in accordance with an illustrative embodiment of the present invention, and which is described here in further detail. A QAM module 250 may, at its core, be comprised of a QAM modulator 340, and may also have a CMTS interface 310, and an IP interface 320. In particularly useful embodiments, the CMTS interface 310 may handle transmissions from a CMTS 120. Likewise, the IP interface 320 handles IP and video data from the video servers 210 and/or the Ethernet switch 220.

In one useful embodiment, the QAM modulator 340 may be capable of analyzing the incoming data signal from the CMTS interface 310 for null or control packets where the QAM modulator 340 may opportunistically insert video data.

Preferably, the QAM module 250 will receive a video IP packet from the video server 210 through the IP interface 320, after which the QAM modulator 340 may encapsulate the entire IP packet in a control or null packet. However, the QAM module 250 may also receive video data from the video server 210 already encapsulated in a control or null packet. In both cases, the QAM modulator 340 would then insert the video encapsulated in a control or null packet into the data stream for transmission. For example, where the CMTS is compliant with the DOCSIS standard, the QAM modulator 340 may encapsulate an IP packet including video data, and received from the video server 210, in a DOCSIS compliant data packet. The video server 210 may also be configured to encapsulate an IP packet having a video data payload into a DOCSIS compliant data packet, which is then passed to the QAM module 250, where the QAM modulator 340 inserts the DOCSIS compliant packet into the data stream, where it is then transmitted to a cable modem 170. Upon receiving a video packet encapsulated in a DOCSIS packet, the cable modem 170 then strips off the DOCSIS encapsulation, resulting in the original video packet, which may then be advantageously processed by the cable modem, and the video data subsequently displayed to the end user.

Alternatively, the QAM modulator 340 may insert the video data by completely overwriting a null packet with a complete video packet encapsulated in an IP packet received from the IP interface 320. Alternatively, the QAM modulator 340 may insert video data into a control packet. In another useful embodiment, the QAM modulator 340 may detect that control packets have a data payload that is either fully or partially empty, and insert video data into the empty portion of the control packet.

The QAM module 250 may also include a time synchronization interface 330 for receiving a timing signal and synchronizing the timing of the QAM modulator 340, and subsequently, the QAM module 250 itself. The time synchronization interface 330 is used by the QAM modulator 340 to adjust the timing of the downstream signal to synchronize with the upstream signal, or with other QAM modules 250. In one preferred embodiment, the upstream signal operates on a time slotted, or time multiplexed system, and the present principles permit the downstream signal to advantageously carry video data without interfering with, or requiring changes to, the existing upstream data transfer protocol.

The QAM module 250 may also have a remote management module 350 in bidirectional communication with the QAM Modulator 340. In one preferred embodiment, the remote management module 350 may allow an administrator to remotely change, monitor, or initiate service to one or more of the cable modems 170 being serviced by a particular QAM module 250.

After the QAM modulator 340 has processed the signals from the CMTS interface 310 and the IP interface 320, the QAM modulator may transmit the combined signal to an optional upconverter 360. Upconverters are known to skilled artisans as devices for taking a video signal and converting the signal to a higher resolution signal.

For example, upconverters are frequently used to convert signals from devices such as digital video discs (DVD) players to a higher resolution output signal, such as that used by High-Definition Television (HDTV). In an alternative, yet equally useful embodiment, the upconverter 360 may be optionally disposed between the IP interface 320 and the QAM modulator 340, processing video signals sent through the IP interface 320, and sending the signals to an output 370. In one useful embodiment, the output 370 is connected to a cable 150 laid to an MDU 160, where the signal is then split into separate signals for each cable modem 170 or set-top box.

Thus, from the above cited figures and descriptions, a method for distributing a video signal, may comprise receiving a digital data signal from a CMTS 120, receiving a digital video signal from a video server 210 such that the CMTS 120 does not handle the digital video signal, inserting data from the digital video signal into the digital data signal to create an output signal and transmitting the output signal to a cable modem 170. Additionally, the method may further comprise multiplexing a plurality of output signals using a Quadrature Amplitude Modulation process to create a multiplexed output signal, wherein the transmitting the output signal is transmitting the multiplexed output signal to a plurality of cable modems 170. The data from the video signal may be inserted into the digital data signal by inserting video data into IP packets, and then inserting the IP packets into the digital data signal, or by encapsulating IP packets including video data into a data packet and inserting the data packet into the digital data signal.

Having described preferred embodiments for a system and method for transmitting digital video data to a plurality of cable modems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A system comprising:
    at least one modulator for receiving at least one of first data signals from a termination and for receiving at least one of second data signals from other than the termination and for combining the at least one of first data signals and the at least one second data signals into an output signal having a plurality of data channels for delivery to a plurality of receiving devices where the at least one of second data signals bypass the termination, wherein the at least one modulator inserts video data into a null Internet protocol (IP) packet of the at least one of first data signals, the null IP packet generated by the termination.

2. The system of claim 1, further comprising a synchronizer for synchronizing the data channels of the output signal.

3. The system of claim 1, wherein the second data signals include video signals.

4. The system of claim 3, wherein each of the at least one modulator is configured to use at least one of the first data signals and one of the video signals to form a data channel associated with one of the plurality of receiving devices.

5. The system of claim 1, wherein the at least one modulator is a Quadrature Amplitude Modulator, for modulating the at least one of second data signals with the at least one of first data signals to form the output signal.

6. The system of claim 1, wherein the output signal is transmitted to the plurality of receiving devices that are cable modems, where each of the plurality of cable modems is associated with one of the plurality of data channels.

7. The system of claim 6, wherein the each of the data channels of the at least one modulator is associated with one of the plurality of cable modems in a predetermined geographic area.

8. The system of claim 7, wherein the predetermined geographic area includes a Multiple Dwelling Unit.

9. The system of claim 1, further comprising a diplexer configured to receive a plurality of upstream data signals over a transmission line from the plurality of receiving devices and transmit the upstream data signals to the termination, wherein the plurality of upstream data signals bypasses the at least one modulator, the diplexer being configured to receive one or more output data signals from the at least one modulator and to transmit the received one or more output data signals to the plurality of receiving devices over the transmission line.

10. The system of claim 1, wherein the at least one modulator is configured to analyze each of the first data signals and selectively insert data from the second data signals into the at least one of first data signals to create the output signal.

11. The system of claim 1, wherein the at least one modulator is configured to insert data into the at least one of the first data signals by encapsulating video data in a Data-Over-Cable Service Interface Specification (DOCSIS) compliant packet.

12. A system, comprising:
    a Cable Modem Termination System (CMTS) for video distribution configured to transmit a plurality of first data signals;
    at least one modulator disposed downstream from the CMTS which is each configured to receive one or more of the plurality of first data signals from the CMTS and configured to receive one or more second data signals from a different source, each of the at least one modulator being configured to combine the one or more of the plurality of first data signals and the one or more second data signals into an output signal having a plurality of data channels, the output signal for delivery to a plurality of receiving devices where the one or more second data signals bypass the CMTS, wherein the at least one modulator inserts video data into a null Internet protocol (IP) packet of at least one of first data signals, the null IP packet generated by the CMTS; and
    a diplexer configured to receive a plurality of upstream data signals over a transmission line from the plurality of receiving devices and transmit the plurality of upstream data signals to the CMTS, wherein the plurality of upstream data signals bypasses the at least one modulator, and the diplexer being configured to receive a one or more output data signals from the at least one modulator and to transmit the received one or more output data signals to the plurality of receiving devices over the transmission line.

13. The system of claim 12, wherein the at least one modulator is configured to insert data into one or more of the plurality of first data signals by encapsulating video data in a Data-Over-Cable Service Interface Specification (DOCSIS) compliant packet.

14. The system of claim 12, wherein the at least one modulator is configured to analyze each of the plurality of first data signals and opportunistically insert data from one or more second data signals into a control packet in the one or more of the plurality of first data signals to create the output signal.

15. A method, comprising:
    receiving at least one first data signal from a termination that generates at least one null Internet protocol (IP) packet in the at least one first data signal;
    receiving at least one digital video signal including digital video data from at least one video server, wherein the at least one digital video signal bypasses the termination; and
    inserting video data from the at least one digital video signal into the null Internet protocol (IP) packet of at least one of first data signals to create an output signal for video distribution.

16. The method of claim 15, further comprising transmitting the output signal to a modem.

17. The method of claim 16, further comprising:
    multiplexing a plurality of output signals using a Quadrature Amplitude Modulation process to create a multiplexed output signal, wherein the transmitting the output signal is transmitting the multiplexed output signal to a plurality of receiving devices.

* * * * *